(12) United States Patent
Kuwajima

(10) Patent No.: US 9,527,349 B2
(45) Date of Patent: Dec. 27, 2016

(54) PNEUMATIC TIRE

(71) Applicant: The Yokohama Rubber Co., LTD., Minato-ku, Tokyo (JP)

(72) Inventor: Masatoshi Kuwajima, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/582,140

(22) Filed: Dec. 23, 2014

(65) Prior Publication Data

US 2015/0114535 A1    Apr. 30, 2015

Related U.S. Application Data

(62) Division of application No. 13/379,928, filed as application No. PCT/JP2010/059616 on Jun. 7, 2010, now Pat. No. 8,944,123.

(30) Foreign Application Priority Data

Jul. 3, 2009    (JP) ................................ 2009-159349

(51) Int. Cl.
    *B60C 11/12*     (2006.01)
    *B60C 11/03*     (2006.01)

(52) U.S. Cl.
    CPC .............. *B60C 11/032* (2013.04); *B60C 11/12* (2013.01); *B60C 11/1218* (2013.04);
    (Continued)

(58) Field of Classification Search
    CPC .. B60C 11/12; B60C 11/1218; B60C 11/1222; B60C 11/1204; B60C 11/1272; B60C 11/1281; B60C 11/1236; B60C 11/1259; B60C 11/1263; B60C 2011/1213; B60C 2011/1254; B60C 2011/1227
    (Continued)

(56) References Cited

U.S. PATENT DOCUMENTS 5,048,583 A * 9/1991 Goto ..................... B60C 11/032
                                                        152/209.17
5,095,963 A     3/1992 Maitre
(Continued)

FOREIGN PATENT DOCUMENTS

| EP | 0 213 452 | 3/1987 |
| EP | 0 963 864 | 12/1999 |

(Continued)

OTHER PUBLICATIONS

Machine translation of JP2007-223493 (no date).*
(Continued)

*Primary Examiner* — Justin Fischer
*Assistant Examiner* — Philip N Schwartz
(74) *Attorney, Agent, or Firm* — Thorpe North & Western

(57) ABSTRACT

A pneumatic tire including a closed sipe in a land portion 3 formed in a tread surface, provided with at least three cuts extending in a radiation direction from an imaginary axis that extends in a depth direction of the land portion, and that terminate in the land portion. The cuts are provided with a spiral-like twist in the depth direction, centered on the imaginary axis, and a twist angle thereof is not less than 10° and not more than 135°. Additionally, a length in the radiation direction of the cuts or a width of the cuts is formed larger at a tread surface side than at a bottom surface side.

18 Claims, 4 Drawing Sheets

(52) U.S. Cl.
CPC ....... *B60C 11/1222* (2013.04); *B60C 11/1281* (2013.04); *B60C 2011/1213* (2013.04); *B60C 2011/1254* (2013.04); *Y10S 152/03* (2013.01)

(58) Field of Classification Search
USPC ............ 152/DIG. 3, 209.17, 209.23, 209.18, 152/209.22
See application file for complete search history.

(56) References Cited

U.S. PATENT DOCUMENTS

| | | | |
|---|---|---|---|
| 5,385,189 A | 1/1995 | Aoki et al. | |
| 2003/0205305 A1* | 11/2003 | Kuwajima | B60C 11/0302 152/209.18 |
| 2006/0032566 A1 | 2/2006 | Koya | |
| 2007/0295435 A1 | 12/2007 | Nguyen et al. | |

FOREIGN PATENT DOCUMENTS

| | | |
|---|---|---|
| JP | 1047603 | 2/1989 |
| JP | 8197914 | 8/1996 |
| JP | H09-263111 | 10/1997 |
| JP | 10138715 | 5/1998 |
| JP | 2002 029226 | 1/2002 |
| JP | 2006-027306 | 2/2006 |
| JP | 2006-27306 | 2/2006 |
| JP | 2007-223493 | 9/2007 |
| JP | 2008 308093 | 12/2008 |

OTHER PUBLICATIONS

Machine translation of EP0213452 (no date).*
International Search Report for International Application No. PCT/JP2010/059616 dated Jul. 30, 2010, 4 pages, Japan.
European Search Report, dated Nov. 22, 2012, 4 pages, Germany.

* cited by examiner

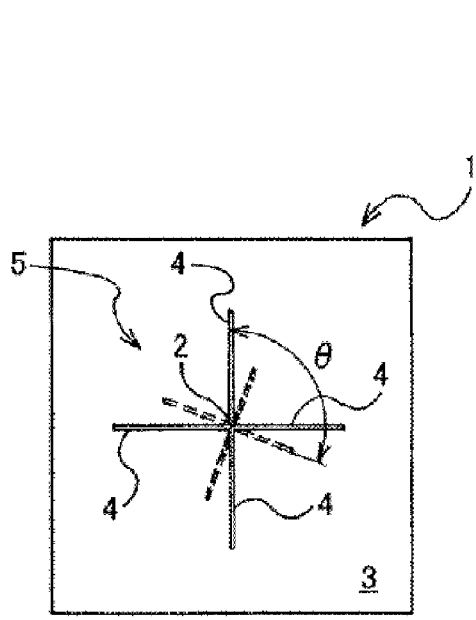
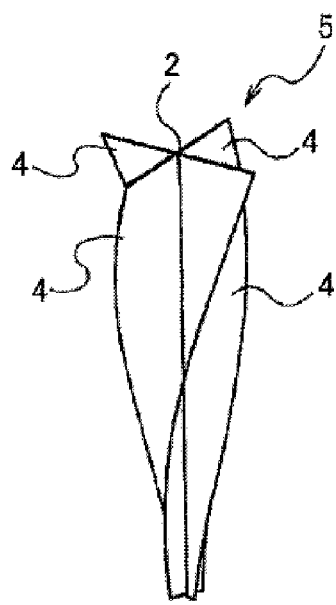
FIG. 1A         FIG. 1B
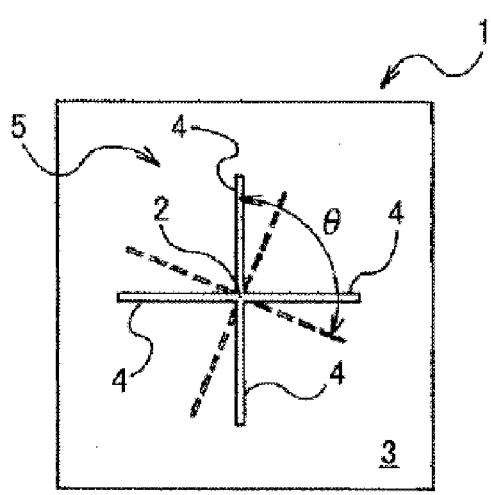
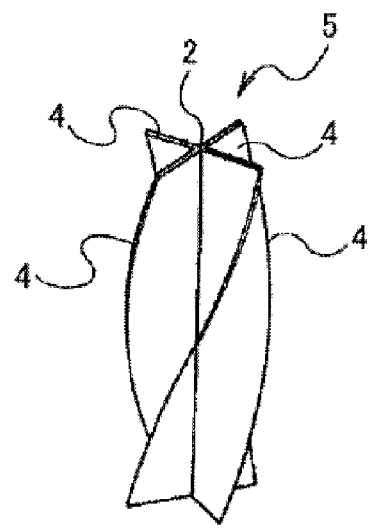
FIG. 2A         FIG. 2B

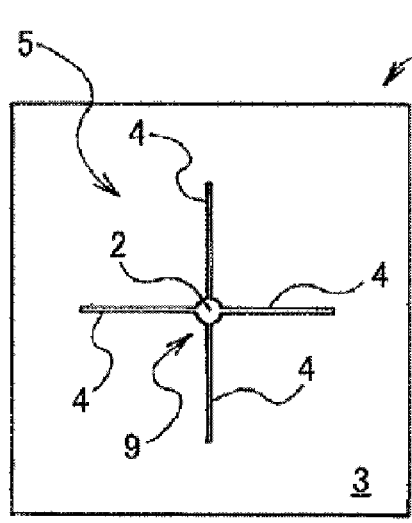
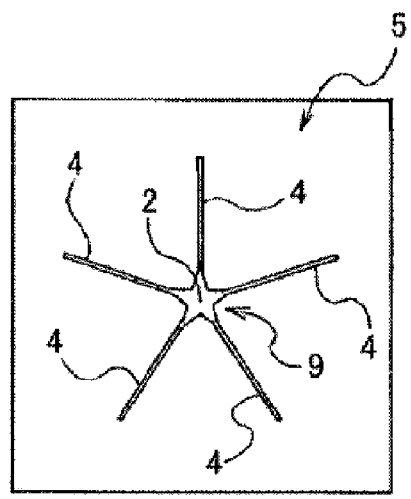
FIG. 3A  FIG. 3B
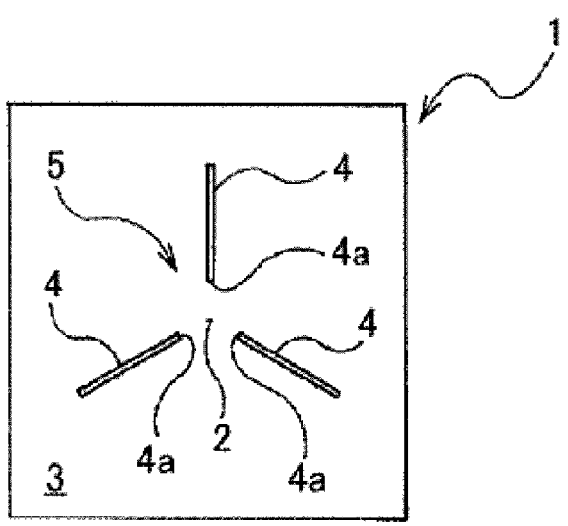
FIG. 4

PNEUMATIC TIRE

TECHNICAL FIELD

The present technology relates to a pneumatic tire, and particularly relates to a pneumatic tire configured so that braking performance on ice is enhanced in a tire having sipes formed in a tread surface thereof, and configured so that, at latter stages of wear after the tire has finished its role as a winter tire, steering stability on dry road surfaces is enhanced by ensuring tread rigidity.

BACKGROUND ART

Sipes are commonly provided in a tread surface to enhance water absorption in order to enhance traveling performance on wet road surfaces and icy and snowy road surfaces. However, if an excessive number of sipes are disposed in the tread surface, tread rigidity will decline, leading to steering stability and braking ability being negatively affected. Therefore, conventionally, various technologies have been proposed regarding the form and arrangement of the sipe (e.g. see Japanese Unexamined Patent Application No. H9-263111A and Japanese Unexamined Patent Application Publication No. 2006-27306A).

Of these proposals, Patent Document 1 describes enhancing steering stability on ice while preventing the sipes cracking or chunk-out failure by disposing two or more sipes in a block face that extend in mutually differing directions so as to cross. Additionally, Japanese Unexamined Patent Application Publication No. 2006-27306A describes enhancing riding comfort while ensuring steering stability and wet braking performance by providing a sipe with a shape having a twist around a twisting axis that extends in a tire radial direction.

However, in the case of Japanese Unexamined Patent Application No. H9-263111A, while the water absorption of the tread surface is enhanced to a certain degree, there is a limitation in that it becomes difficult to maintain steering stability due to a decline in tread rigidity if further enhancements of the water absorption are attempted by increasing the number of sipes. Additionally, in the case of Japanese Unexamined Patent Application Publication No. 2006-27306A, due to a twist angle being set to a size reaching 135° and greater, there are problems such as releaseability from a mold after the tire is vulcanization molded being negatively affected and the tread surface becoming easily damageable.

Moreover, studless tires having sipes provided in a tread surface thereof may be used as summer tires after the tire has become worn and finished its role as a winter tire. Generally, rubber is used for the tread rubber of studless tires that is softer than that used for the tread rubber in summer tires. Therefore, there is a problem in that with such a tire, traveling performance as a summer tire cannot be ensured after the tire has finished its role as a winter tire. As a result, the level to which traveling performance as a summer tire is ensured at latter stages of wear after the tire has finished its role as a winter tire is an important issue for such studless tires as those described above.

SUMMARY

The present technology provides a pneumatic tire configured so that braking performance on ice is enhanced in a tire having sipes formed in a tread surface thereof, and is configured so that, at latter stages of wear after the tire has finished its role as a winter tire, steering stability on dry road surfaces is enhanced by ensuring tread rigidity.

In a first aspect of the present technology (hereinafter referred to as the "first aspect"), as described in Claim 1, a pneumatic tire of the present technology includes a land portion formed in a tread surface; and closed sipes provided with at least three cuts extending in a radiation direction from an imaginary axis that extends in a depth direction of the land portion, and that terminate in the land portion, wherein the cuts of the closed sipes are provided with a spiral-like twist in the depth direction, centered on the imaginary axis. A twist angle of the cuts from a top surface to a bottom surface of the land portion is not less than 10° and not more than 135°, and a length in the radiation direction of the cuts is formed longer at a tread surface side than at a bottom surface side of a depth direction of the closed sipes.

Furthermore, with the configuration described above, a width of the cuts is preferably formed larger at a tread surface side than at a bottom surface side or, alternately, smaller at the tread surface side than at the bottom surface side of a depth direction of the closed sipes.

In a second aspect of the present technology (hereinafter referred to as the "second aspect"), as described in Claim 4, a pneumatic tire of the present technology includes a land portion formed in a tread surface; and closed sipes provided with at least three cuts extending in a radiation direction from an imaginary axis that extends in a depth direction of the land portion, and that terminate in the land portion, wherein the cuts of the closed sipes are provided with a spiral-like twist in the depth direction, centered on the imaginary axis. A twist angle of the cuts from a top surface to a bottom surface of the land portion is not less than 10° and less than 135°, and a width of the cuts is formed larger at a tread surface side than at a bottom surface side of a depth direction of the closed sipes.

Furthermore, with the configuration described above, a length in the radiation direction of the cuts is preferably formed shorter at a tread surface side than at a bottom surface side of a depth direction of the closed sipes.

Additionally, the first aspect and the second aspect are preferably configured as described in (1) to (3) below.

(1) From 3 to 6 of the cuts are provided.

(2) Edges of the cuts on the imaginary axis side are connected, or, alternately, not connected to the imaginary axis. When connected, a small hole is preferably formed in the depth direction of the closed sipes along the imaginary axis.

(3) Linear sipes extending in a tire width direction are provided along with the closed sipes in the land portion. In this case, when the land portion is a block, the closed sipes are preferably arranged along a tire width direction in a front edge and/or a back edge in a tire circumferential direction of the block.

According to the present technology described above, a closed sipe is provided in a land portion formed in a tread surface having at least three cuts extending in a radiation direction from an imaginary axis that extends in a depth direction of the land portion and that terminate in the land portion. The cuts are provided with a spiral-like twist in a depth direction centered on the imaginary axis, and a twist angle is not less than 10° and less than 135°. Therefore, water absorption can be enhanced due to an increase in cubic capacity accompanying the twist of the cuts while declines in tread rigidity can be suppressed without hindering releaseability from a mold. As a result, braking performance on ice can be enhanced.

Furthermore, in the first aspect, a length in the radiation direction of the cuts is formed longer at a tread surface side than at a bottom surface side in a depth direction of the closed sipe and, in the second aspect, a width of the cuts is formed larger at the tread surface side than at the bottom surface side in the depth direction of the closed sipe. As a result, tread rigidity will gradually increase as the decrease in cubic capacity of the cuts accelerates due to wear progressing. Therefore, steering stability on dry road surfaces can be enhanced at latter stages of wear after the tire has finished its role as a winter tire.

BRIEF DESCRIPTION OF THE DRAWINGS

FIGS. 1A and 1B are explanatory drawings illustrating an example of a closed sipe that is formed in a tread surface of a pneumatic tire according to a first aspect of the present technology. FIG. 1A is a planar view thereof, and FIG. 1B is a perspective view illustrating an outer wall shape thereof.

FIGS. 2A and 2B are explanatory drawings illustrating an example of a closed sipe that is formed in a tread surface of a pneumatic tire according to a second aspect of the present technology. FIG. 2A is a planar view thereof, and FIG. 2B is a perspective view illustrating an outer wall shape thereof.

FIGS. 3A and 3B are each planar views illustrating examples of the closed sipe according to other embodiments of the present technology.

FIG. 4 is a planar view illustrating an example of the closed sipe according to yet another embodiment of the present technology.

DETAILED DESCRIPTION

Figure 5:
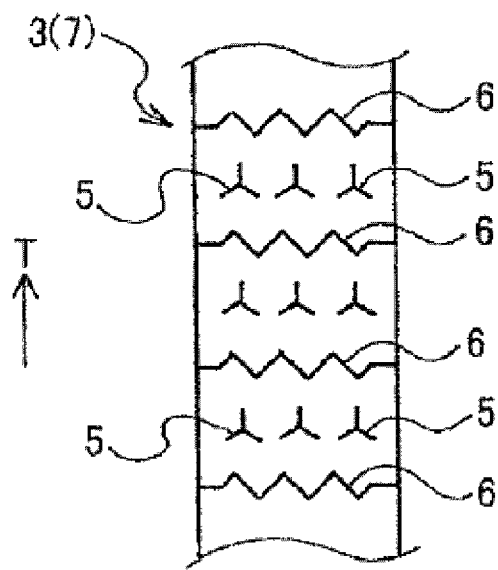
FIG. 5 is a plan view illustrating a portion of the tread surface of the pneumatic tire according to an embodiment of the present technology.

Detailed descriptions will be given below of a configuration of the present technology with reference to the accompanying drawings.

FIG. 1A is a plan view illustrating, in a rectangular frame, an example of a closed sipe formed in a tread surface of a pneumatic tire according to the first aspect of the present technology. FIG. 1B is a perspective view illustrating an outer wall shape of the closed sipe of FIG. 1A.

In FIG. 1A, a land portion 3 is formed in a tread surface 1 of a pneumatic tire of the present technology. A closed sipe 5 is formed in the land portion 3 including at least three cuts 4 (four in the drawing) extending in a radiation direction from an imaginary axis 2 that extends in a depth direction of the land portion 3, and that terminate in the land portion 3. Each of the cuts 4 of the closed sipe 5 of the present technology are provided with a spiral-like twist in a depth direction centered on the imaginary axis 2 (see FIG. 1B), and a twist angle θ from a top surface to a bottom surface of the land portion 3 is configured to be not less than 10° and to be less than 135°, and preferably from 90° to 120°. In the drawings, the dotted lines represent the bottom surfaces of the cuts 4.

As a result, water absorption can be enhanced due to an increase in cubic capacity accompanying the twist of the cuts 4 while declines in tread rigidity can be suppressed without hindering releaseability from a mold. Thus, braking performance on ice can be enhanced.

Furthermore, with the closed sipe 5 according to the first aspect illustrated in FIGS. 1A and 1B, a length in the radiation direction of the cuts 4 is formed longer at a tread surface 1 side than at a bottom surface side in a depth direction of the closed sipe 5. As a result, tread rigidity will gradually increase as the cubic capacity of the cuts 4 decreases due to wear progressing. Therefore, steering stability on dry road surfaces can be enhanced at latter stages of wear after the tire has finished its role as a winter tire.

Note that the "twist angle θ" of the cuts 4 from the top surface to the bottom surface of the land portion 3 refers to a twist angle from a top edge of the tread surface 1 side to a bottom edge of the bottom surface side of the cuts 4. The same definition applies in the second aspect as well.

The length in the radiation direction of the cuts 4 described above is preferably configured to become smaller in a gradual or stepwise manner from the tread surface 1 side toward the bottom surface side. Here, the lengths in the radiation direction of the cuts 4 at the tread surface 1 and at the bottom surface of the closed sipe 5 are set appropriately according to the performance desired for each tire.

However, from a perspective of ensuring that releaseability from a mold after vulcanization and steering stability performance at latter stages of wear are well-balanced, a relationship between a length L2 in the radiation direction at the bottom surface and a length L1 in the radiation direction at the tread surface 1 of the cuts 4 is preferably configured so as to be $0.05 \leq L2/L1 \leq 0.5$.

Furthermore, in the first aspect described above, a width of the cuts 4 can be configured so as to vary with respect to the depth direction of the closed sipe 5. When the width of the cuts 4 is configured to be greater at the tread surface 1 side than at the bottom surface side, the cubic capacity of the cuts 4 decreases due to wear progressing. Therefore, tread rigidity at latter stages of wear increases even more.

On the other hand, when the width of the cuts 4 is configured to be smaller at the tread surface 1 side than at the bottom surface side, it is possible to adjust the cubic capacity of the cuts 4 in accordance with the progression of wear. Therefore, such a configuration can be advantageously applied to a tire in which the balance between steering stability and wet performance at latter stages of wear is a point of interest.

FIGS. 2A and 2B each illustrate a form of the closed sipe 5 according to the second aspect. With the closed sipe 5 of the second aspect, the width of the cuts 4 is formed so as to be larger at the tread surface 1 side than at the bottom surface side in the depth direction of the closed sipe 5. As a result, tread rigidity will gradually increase as the cubic capacity of the cuts 4 decreases due to wear progressing, just as with the closed sipe 5 according to the first aspect. Therefore, steering stability on dry road surfaces can be enhanced at latter stages of wear after the tire has finished its role as a winter tire.

The width of the cuts 4 described above is preferably configured to become smaller in a gradual or stepwise manner from the tread surface 1 side toward the bottom surface side. The widths of the cuts 4 at the tread surface 1 and at the bottom surface of the closed sipe 5 are set appropriately according to the performance desired for each tire. However, from a perspective of ensuring that releaseability from a mold after vulcanization and steering stability performance at latter stages of wear are well-balanced, a relationship between a width W2 at the bottom surface and a width W1 at the tread surface 1 of the cuts 4 is preferably configured so as to be $1.5 \leq W1/W2 \leq 5.0$.

Furthermore, in the second aspect, the length in the radiation direction of the cuts 4 is formed shorter at a tread surface 1 side than at a bottom surface side in the depth direction of the closed sipe 5. In this case, a device is needed by which releaseability from a mold is ensured. However, since it is possible to adjust the cubic capacity of the cuts 4 in accordance with the progression of wear, such a configuration can be advantageously applied to a tire in which the balance between steering stability and wet performance at latter stages of wear is a point of interest.

With the pneumatic tire of the present technology configured as described above, the closed sipe 5 is formed from at least three of the cuts 4 that are provided with a twist around the imaginary axis 2 that extends in the tire depth direction of the land portion 3. Therefore, when removing the tire from the mold after vulcanization, the tread surface 1 becomes easily damageable by the molding blades of the cuts 4. From this perspective, freely rotating molding blades of the cuts 4 centered on the imaginary axis 2 are preferably provided on an inner surface of the mold used for vulcanization molding the pneumatic tire of the present technology, and vulcanization molding is preferably performed using this mold.

In the embodiments described above, examples where four of the cuts 4 that form the closed sipe 5 are provided are described, but the number of the cuts 4 forming the closed sipe 5 of the present technology is not limited thereto, and preferably from 3 to 6 of the cuts 4 are provided, in accordance with the form of the tread pattern. If the number of the cuts 4 is seven or greater, cracking will easily occur in in the tread surface 1 during traveling of the tire.

Additionally, in the embodiments described above, examples where the edges of the cuts 4 on the imaginary axis 2 side are each connected to the imaginary axis 2 are described, but as illustrated in FIG. 4, with the pneumatic tire of the present technology, the edges 4a of the cuts 4 on the imaginary axis 2 side forming the closed sipe 5 may each be disposed so as to be disconnected from the imaginary axis 2. The effects in this case are no different than those in the case of the embodiments described above.

In the present technology, when the edges of the cuts 4 on the imaginary axis 2 side are each connected to the imaginary axis 2, as illustrated in FIGS. 3A and 3B, a small hole 9 can be formed in the depth direction of the closed sipe 5 along the imaginary axis 2. As a result, water absorption on icy road surfaces can be further enhanced and braking performance when traveling on icy road surfaces can be further enhanced.

A size and a cross-sectional shape of the small hole 9 formed along the imaginary axis 2 is not particularly limited but, as illustrated in FIG. 3A, can be configured to be substantially round or polygonal. Alternately, as illustrated in FIG. 3B, depending on the number of the cuts 4 that form the closed sipe 5, the cross-sectional shape of the small hole 9 can be configured so as to form a star shape that corresponds to the number of the cuts 4.

Additionally, in the embodiments described above, an example is described in which the cuts 4 that form the closed sipe 5 extend in a linear manner in the radiation direction. However, a planar form of the cuts 4 of the present technology is not limited thereto, and can be formed so as to have a curving (arch), a wavelike, or a zigzag form.

With the pneumatic tire of the present technology, the closed sipe 5 described above is preferably disposed so as to be dispersed throughout an entire surface of the land portion 3 formed in the tread surface 1. In this case, from the perspectives of uniformly maintaining a rigidity distribution of the land portion 3 and suppressing uneven wear, the closed sipe 5 is preferably disposed so that the cuts 4 that form the closed sipe 5 are not near each other.

Figure 6:
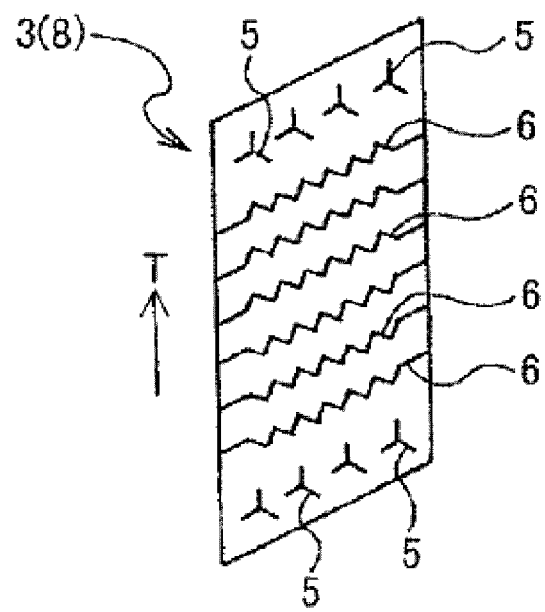
FIG. 6 is a plan view illustrating a portion of the tread surface of the pneumatic tire according to another embodiment of the present technology.

Furthermore, depending on the characteristics desired from the tire, as illustrated in FIGS. 5 and 6, the closed sipe 5 can be disposed in the land portion 3 formed in the tread surface 1 along with a linear sipe 6 extending in the tire width direction. As a result, the edge effects resulting from the disposal of the linear sipe 6 are increased, and a high degree of both steering stability and braking performance on ice can be achieved.

In FIG. 5, an example is illustrated in which a plurality of the closed sipes 5, disposed in parallel in a surface of a rib 7 formed in the tread surface 1, and the linear sipes 6, having a zigzag form extending in the tire width direction, are disposed alternately in a tire circumferential direction T. However, the form of the linear sipe 6 and the arrangement thereof are not limited thereto, and can be modified as desired depending on the form of tread pattern. Examples of the form of the linear sipe 6 include substantially linear or wavelike forms, three-dimensional forms, and the like.

Additionally, as illustrated in FIG. 6, when the land portion 3 formed in the tread surface 1 is a block 8, the block 8 is partitioned by the linear sipe 6 that extends in the tire width direction; and the closed sipe 5 is preferably disposed along the tire width direction in a front edge and/or back edge in the tire circumferential direction, which correspond to a trailing edge side and/or a leading edge (in FIG. 6, the front edge and the back edge), of the block 8.

Particularly, to an extent possible, the closed sipe 5 of the present technology is preferably disposed along the tire width direction, without the linear sipe 6 extending in the tire width direction being formed in regions of the front edge and/or the back edge corresponding to about 30% or less of a length of the block 8 in the tire circumferential direction. As a result, block rigidity in the front edge and/or the back edge of the block 8 can be ensured, steering stability can be enhanced while the generation of uneven wear is suppressed, water absorption can be enhanced, and braking performance on ice can be enhanced.

As described above, the pneumatic tire of the present technology includes closed sipes in a land portion formed in a tread surface, provided with at least three cuts extending in a radiation direction from an imaginary axis that extends in a depth direction of the land portion, and that terminate in the land portion. The cuts of the closed sipes are provided with a spiral-like twist in the depth direction, centered on the imaginary axis, and a twist angle thereof is not less than 10° and less than 135°. Additionally, a length in the radiation direction of the cuts or a width of the cuts is formed larger at a tread surface side than at a bottom surface side. As a result, in addition to enhancing braking performance on ice as a winter tire, steering stability performance on dry road surfaces can also be enhanced due to tread rigidity being ensured at latter stages of wear after the tire has finished its role as a winter tire. Therefore, the pneumatic tire of the present technology can be widely applied to studless tires for use on icy and snowy road surfaces because superior effects can be provided while realizing a simple construction.

EXAMPLES

Figure 7:
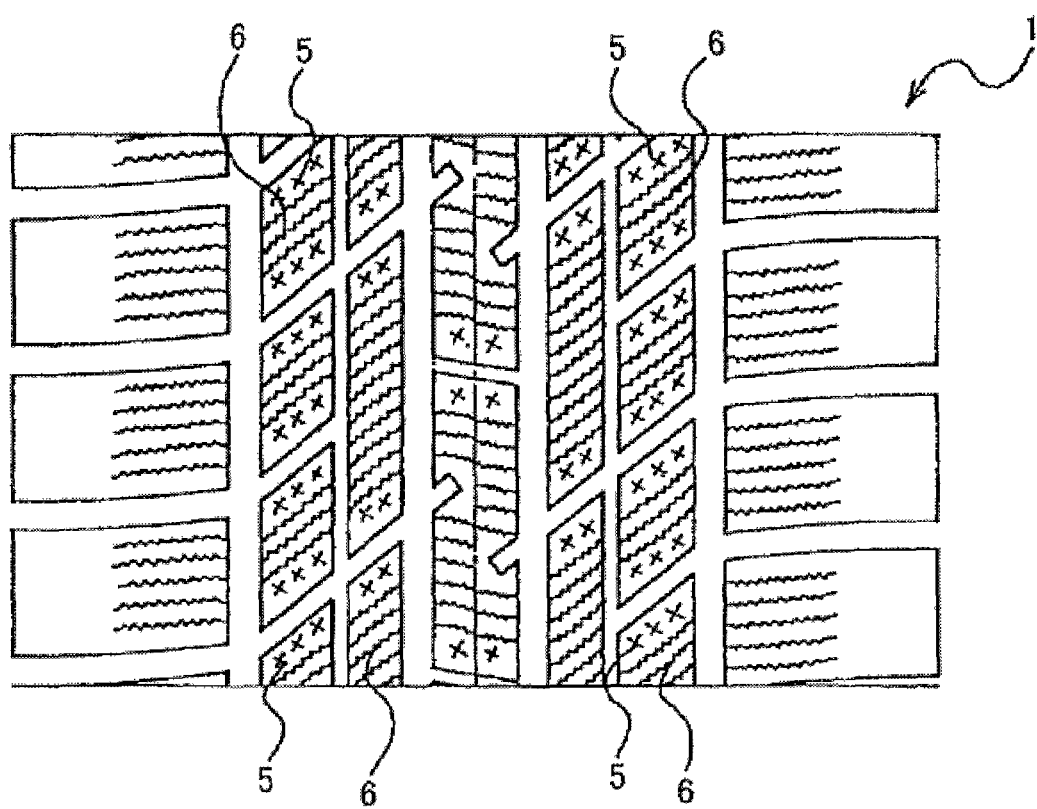
FIG. 7 is a plan view illustrating a portion of the tread surface of the pneumatic tire used in the Working Examples.

Present technology tires (Working Examples 1 to 4) and comparative tires (Comparative Examples 1 and 2) were manufactured having a tire size of 195/65R15 91Q, the tread pattern illustrated in FIG. 7, and where a planar form of the closed sipe 5 provided in the land portion in the tread surface is the form illustrated in FIG. 1A. The length in the radiation direction of the cuts and the width of the cuts at the tread surface and the bottom surface of the closed sipe 5, as well as the twist angle of the cuts were varied as shown in Table 1. Note that in each of the tires, a depth of the closed sipe 5 was 7 mm.

With each of these six types of tires, releaseability when removing the tire from a mold after vulcanization was also evaluated. Furthermore, each of these six types of tires was evaluated for braking performance on ice when new, and steering stability performance at latter stages of wear according to the test methods described below.

In evaluating the releaseability when removing the tire from a mold after vulcanization, tires where the tread surface was not damaged were shown as "∘" and tires where the tread surface was damaged were shown as "x" in Table 1. Moreover, those tires where the tread surface was damaged were excluded from the new tire evaluations of braking performance on ice and steering stability performance at latter stages of wear.

Steering stability performance at latter stages of wear as mentioned above was evaluated at a state at which the tread surface was pre-worn until a remaining groove depth of the main groove (maximum depth when new: 8.9 mm) formed in the tread surface was 40% of the depth when new.

Evaluation of Braking Performance on Ice When New

Each tire was assembled on a 15×6JJ rim, inflated to an air pressure of 230 kPa, and mounted on the front and back wheels of a passenger car (made in Japan) having an engine displacement of 2,000 cc. A braking test from an initial speed of 40 km/hr was performed on an icy road surface, and braking performance on ice was evaluated based on the inverse of the stopping distance following application of the brakes. The results were indexed with Comparative Example 1 being assigned an index value of 100. The results are shown in Table 1. A larger index value indicates superior braking performance on ice.

Evaluation of Steering Stability Performance at Latter Stages of Wear

Each tire was assembled on a 15×6JJ rim, inflated to an air pressure of 230 kPa, and mounted on the front and back wheels of a passenger car (made in Japan) having an engine displacement of 2,000 cc. The passenger car was driven at a speed from 60 to 100 km/hr on an asphalt road surface test course, and three experienced test drivers performed a sensory evaluation. The results were averaged and scored on a five-point scale with Comparative Example 1 being assigned a score of 3. The scores are shown in Table 1. Larger scores indicate superior steering stability.

was also enhanced compared with Comparative Example 1. Note that releaseability from the mold was found to be negatively affected in Comparative Example 2, where the twist angle of the cuts was set to 140°.

What is claimed is:

1. A pneumatic tire comprising: a land portion formed in a tread surface; and a closed sipe provided in the land portion with at least three cuts extending in a radiation direction from an imaginary axis that extends in a depth direction of the land portion, and that terminate in the land portion, wherein the cuts of the closed sipe are provided with a spiral-like twist in the depth direction, centered on the imaginary axis, wherein
    the closed sipe forms the spiral-like twist, a twist angle of the cuts from a top surface to a bottom surface of the land portion is not less than 10° and less than 120°, a width of the cuts is formed larger at a tread surface side than at a bottom surface side in a depth direction of the closed sipes, and the width of the cuts becomes smaller in a gradual or stepwise manner from the tread surface side toward the bottom surface side of the spiral-like twist of the closed sipe.

2. The pneumatic tire according to claim 1, wherein a length in the radiation direction of the cuts is formed shorter at a tread surface side than at a bottom surface side in the depth direction of the closed sipes.

3. The pneumatic tire according to claim 1, wherein from 3 to 6 of the cuts are provided.

4. The pneumatic tire according to claim 3, wherein edges of the cuts on the imaginary axis side are connected to the imaginary axis.

5. The pneumatic tire according to claim 4, wherein a small hole is formed in the depth direction of the closed sipe along the imaginary axis.

6. The pneumatic tire according to claim 3, wherein edges of the cuts on the imaginary axis side are not connected to the imaginary axis.

7. The pneumatic tire according to claim 1, wherein edges of the cuts on the imaginary axis side are connected to the imaginary axis.

8. The pneumatic tire according to claim 7, wherein a small hole is formed in the depth direction of the closed sipe along the imaginary axis.

TABLE 1

|  |  |  | Comparative Example 1 | Working Example 1 | Working Example 2 | Working Example 3 | Working Example 4 | Comparative Example 2 |
|---|---|---|---|---|---|---|---|---|
| Cuts 4 | Length in radiation direction (mm) | At tread surface L1 | 2.0 | 3.0 | 3.0 | 2.0 | 2.0 | 2.0 |
|  |  | At bottom surface L2 | 2.0 | 1.3 | 1.3 | 2.0 | 2.0 | 2.0 |
|  | Width of cuts (mm) | At tread surface W1 | 0.5 | 0.5 | 0.5 | 1.0 | 1.0 | 0.5 |
|  |  | At bottom surface W2 | 0.5 | 0.5 | 0.5 | 0.4 | 0.4 | 0.5 |
|  | Twist angle (°) |  | 90 | 90 | 120 | 90 | 120 | 140 |
| Evaluation | Releaseability from mold |  | ∘ | ∘ | ∘ | ∘ | ∘ | x |
|  | Braking performance on ice (when new) |  | 100 | 102 | 103 | 103 | 104 | — |
|  | Steering stability performance (at latter stages of wear) |  | 3.0 | 4.0 | 3.7 | 4.0 | 3.7 | — |

It is clear from Table 1 that, with the present technology tires, steering stability performance at latter stages of wear was enhanced while braking performance on ice when new 9. The pneumatic tire according to claim 1, wherein edges of the cuts on the imaginary axis side are not connected to the imaginary axis.

10. The pneumatic tire according to claim 1, wherein a linear sipe extending in a tire width direction is provided along with the closed sipe in the land portion.

11. The pneumatic tire according to claim 10, wherein the land portion is a block, and the closed sipe is arranged along a tire width direction in a front edge and/or a back edge in a tire circumferential direction of the block.

12. The pneumatic tire according to claim 1, wherein a relationship between a width W2 at the bottom surface and a width W1 at the tread surface of the cuts is configured so as to be $1.5 \leq W1/W2 \leq 5.0$.

13. The pneumatic tire according to claim 1, further comprising a linear sipe extending in a tire width direction.

14. The pneumatic tire according to claim 1, wherein the closed sipe is disposed along the tire width direction, and a linear sipe is not formed in regions of a front edge and/or a back edge corresponding to about 30% or less of a length of the land portion in the tire circumferential direction.

15. The pneumatic tire according to claim 1, wherein the pneumatic tire is molded and vulcanized using a mold having freely rotating molding blades provided on an inner surface of the mold.

16. The pneumatic tire according to claim 5, wherein a diameter of the small hole is greater than the width of the cuts.

17. The pneumatic tire according to claim 7, wherein a diameter of the small hole is greater than the width of the cuts.

18. A pneumatic tire comprising: a land portion formed in a tread surface; and a closed sipe provided in the land portion with at least three cuts extending in a radiation direction from an imaginary axis that extends in a depth direction of the land portion, and that terminate in the land portion, wherein the cuts of the closed sipe are provided with a spiral-like twist in the depth direction, centered on the imaginary axis, wherein a twist angle of the cuts from a top surface to a bottom surface of the land portion is not less than 10° and less than 120°, and a width of the cuts is formed larger at a tread surface side than at a bottom surface side in a depth direction of the closed sipes.

* * * * *